Nov. 23, 1965  C. A. MATTSON ETAL  3,219,277
LAWN SPRINKLER
Filed Aug. 19, 1963  2 Sheets-Sheet 1
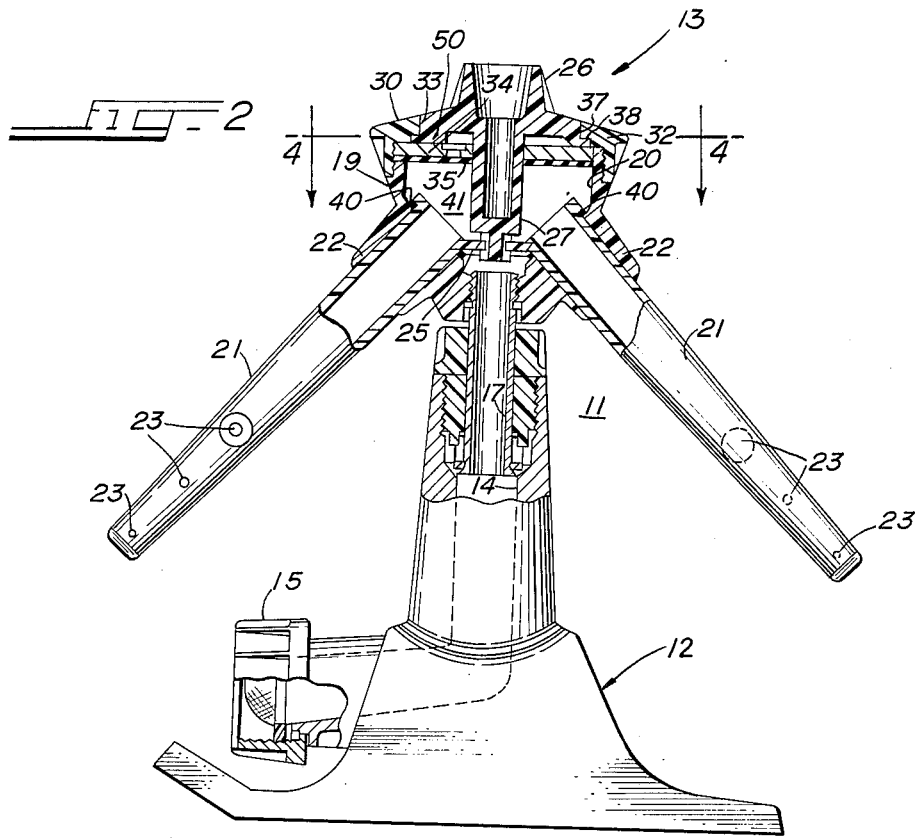
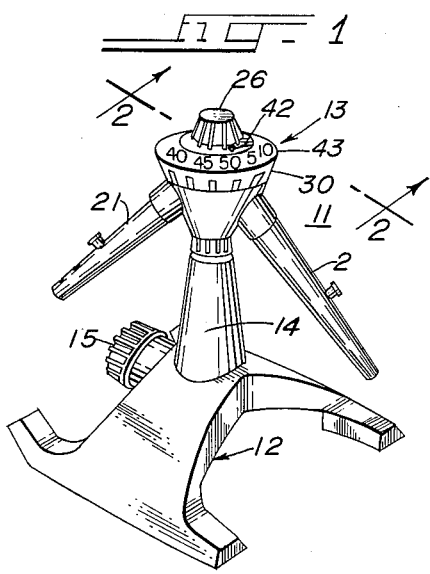
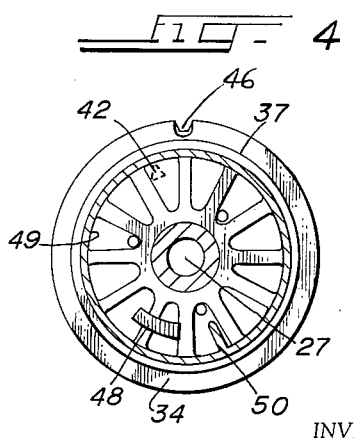
INVENTOR.
CHARLES A. MATTSON
WILLIAM V. KALNINS
BY
George R. Clark
Atty.

Nov. 23, 1965  C. A. MATTSON ETAL  3,219,277
LAWN SPRINKLER
Filed Aug. 19, 1963  2 Sheets-Sheet 2
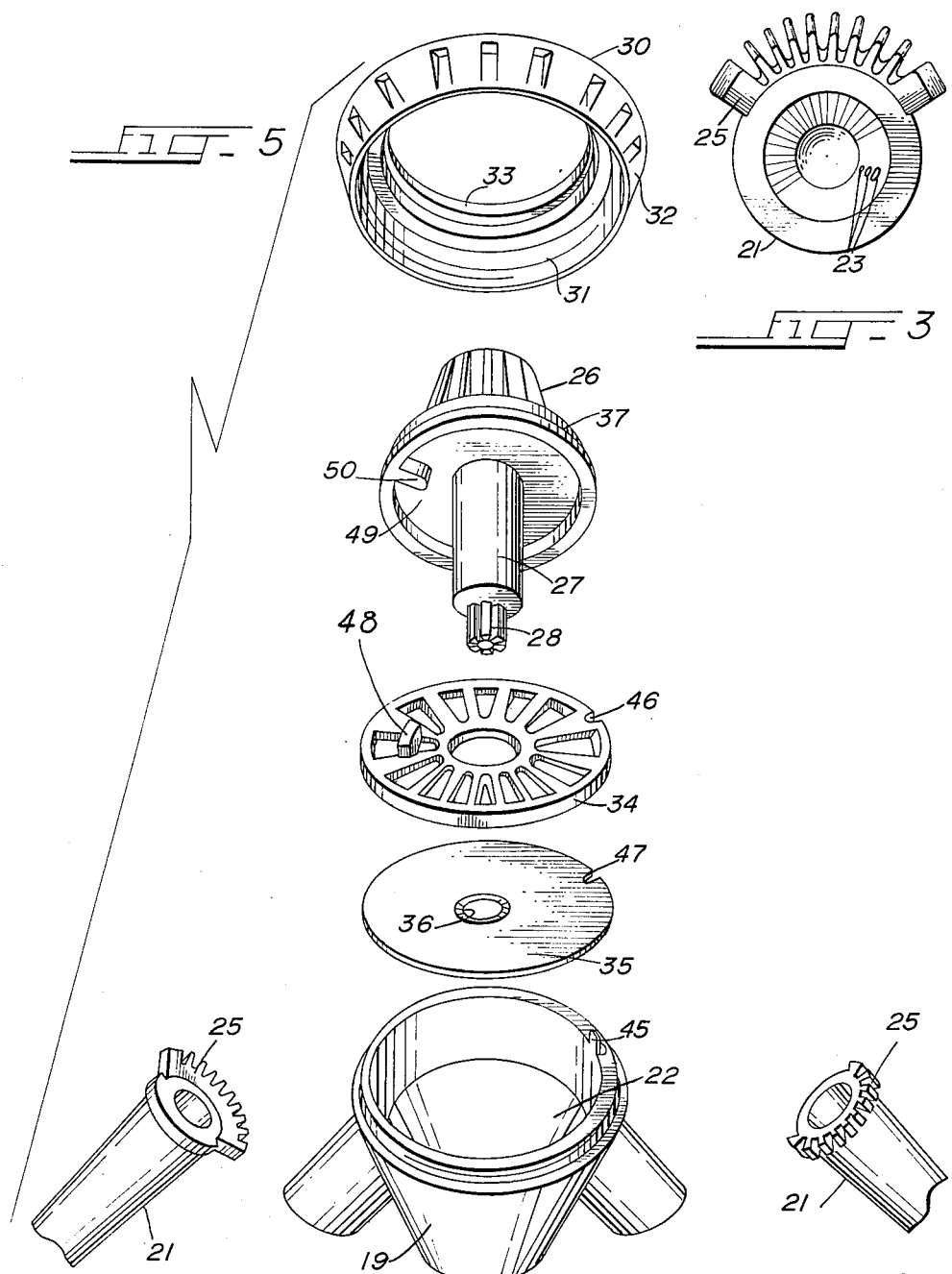
INVENTOR.
CHARLES A. MATTSON
WILLIAM V. KALNINS
BY
George R. Clark
Atty.

3,219,277
LAWN SPRINKLER
Charles A. Mattson and William V. Kalnins, Oak Park, Ill., assignors to Sunbeam Corporation, Chicago, Ill., a corporation of Illinois
Filed Aug. 19, 1963, Ser. No. 302,930
7 Claims. (Cl. 239—253)

The present invention relates to lawn sprinklers and more particularly to a simplified head structure for a sprinkler having spray arms adjustably mounted with respect to a rotating head.

The general type of sprinkler to which the invention relates is disclosed and claimed in Jepson Patent No. 2,335,281, which patent is assigned to the same assignee as the instant application. In the Jepson patent, there is disclosed a sprinkler having a head mounted for rotation about a vertical axis and having a pair of elongated spray tubes which are rotatable about their axes to vary the size of the area sprayed by the sprinkler. To control the spray tubes and thereby vary the area sprinkled, there is provided a control knob which may be rotated through almost 360 degrees to obtain a wide variation in the area covered by the sprinkler. The control knob and the adjacent portions of the head are provided with cooperating indicia which are intended to show the position of the spray tubes with respect to the head or to show the size of the area which would be covered by the sprinkler. While the sprinkler disclosed in the Jepson patent was entirely satisfactory from a functional standpoint, it was difficult and expensive to manufacture. At the present time, the marketing of sprinklers has become so competitive that a sprinkler must be placed on sale for a relatively low price or it will not sell in satisfactory quantities regardless of the functional advantages it possesses.

To achieve a low selling price, it is important that the sprinkler design include component parts that are simple and inexpensive to manufacture and parts that may be quickly and easily assembled without the necessity of special tools, assembly jigs and the like.

Accordingly, it is an object of the present invention to provide a new and improved lawn sprinkler which is simple in design and easy to assemble.

A further object of the present invention is to provide an improved lawn sprinkler which may be completely assembled without the use of any tools or fixtures.

It is an additional object of the invention to provide a lawn sprinkler made of inexpensive plastic molded parts which are keyed together to assure proper and accurate assembly of all the parts.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings wherein:

FIG. 1 is a perspective view of a lawn sprinkler embodying my invention;

FIG. 2 is a side elevational view of the sprinkler shown in FIG. 1 with portions of the head cut away on line 2—2 of FIG. 1;

FIG. 3 is an end view of the spray tube utilized in the sprinkler;

FIG. 4 is a fragmentary sectional view taken on line 4—4 of FIG. 2 with the outer assembly ring removed; and FIG. 5 is an exploded perspective view of the sprinkler head.

Briefly, the invention relates to an improved rotary lawn sprinkler head fabricated of molded plastic parts which may be readily assembled together without the use of any tools or fixtures. The various parts are provided with keying projections and recesses so that they may be accurately and properly assembled together.

Referring now to the drawings, there is shown a lawn sprinkler designated generally by reference numeral 11. The lawn sprinkler includes a base 12 and a head 13 which is supported on the base 12 for rotation about a generally vertical axis. The base 12 is provided with an integrally formed water conduit 14, the outer end of which is provided with a hose coupling 15 for connection to a garden hose to supply water to the sprinkler.

Extending upwardly from the base 12 is a bearing stud 17 which is rotatably received in the upper end of the base 12 and is threadedly secured at its upper end to the sprinkler head 13. The bearing stud is hollow, thus permitting water to pass from the water conduit 14 in the base 12 upwardly into the head 13.

The head 13 includes a body or head member 19 which is supported by the bearing stud 17. The body 19 is an inverted cup-shaped member having an upwardly facing opening or mouth 20. The body 19 serves to support a pair of elongated spray tubes 21 which extend outwardly and downwardly therefrom. Elongated bosses 22 extend outwardly from the body 19 to journal the spray tubes 21 for rotation about their lengthwise extending axes. Each of the spray tubes is provided with a plurality of spray orifices 23.

To rotate the spray tubes 21 about their axes, they are formed at their inner ends within the body 19 with gear sectors 25 which extend angularly therefrom as is best shown in FIGS. 2 and 3. A control knob 26 is provided on the head 13 to permit adjustment of the spray tubes 21. The control knob 26 includes a downwardly extending shaft 27 which has formed on its lower end a spur gear 28. The spur gear 28 is in meshing engagement with the gear sectors 25 so that rotation of the control knob 26 causes simultaneous rotation of the spray tubes 21.

For the purpose of retaining the various parts of the sprinkler head 13 in assembled relation, there is provided an assembly ring or cap 30 which includes a cylindrical portion 31 and a generally horizontal, inwardly extending flange 32. The flange 32 defines a central opening 33 through which the control knob 26 extends.

To close the opening 20 in the body 19, there is provided a seal support or support member 34 which is a circular disc received within the threaded portion 31 of the ring 30 and urged downwardly against the top of the body 19 by the flange 32. A suitable rubber sealing gasket 35 is positioned below the seal support 34 and is substantially coextensive therewith. The gasket 35 is gripped around its outer periphery between the seal support 34 and the body member 19. The center of the gasket 35 is provided with a somewhat undersized hold 36 whereby the gasket 35 is in good sealed engagement with the shaft 27.

The control knob 26 is formed with an outwardly extending flange 37 which bears against the seal support 34. In addition, the outer periphery of the control knob flange 37 lies beneath a stepped portion 38 in the assembly ring flange 32. The stepped portion 38 is of adequate height so that the control knob 26 is not gripped tightly by the assembly ring 30 after it has been threaded completely onto the body member 19. This clearance permits the control knob 26 to be readily rotated with respect to the head 13. Suitable O-ring gaskets 40 are provided on the inner ends of the spray tubes 21 to provide a completely sealed chamber 41 within the body member 19.

As may be seen in FIG. 1, the assembly ring 30 and the control knob 26 are provided with cooperating indicia, the knob 26 having an arrow or indicator 42 and the ring 30 having numerals 43 arranged around on the flange 32. Inasmuch as the assembly ring 30 represents the single means to retain the head parts together, it should be obvious that the parts must be fitted together properly if the indicia 42 and 43 are to bear the correct relationship with the positions of the spray tubes 21. This objective is achieved by providing keying or locating means on the body 19, the assembly ring 30, the seal support 34 and the control knob 26.

The locating means on the body member 19 consists of a projection 45 extending upwardly from adjacent the threaded portion thereof as is best shown in FIG. 5. The projection 45 serves to locate the seal support 34 by means of a notch or radial slot 46 extending inwardly from the outer periphery thereof. The gasket 35 is provided with a clearance notch 47 in order to permit the gasket to lie flat against the end wall of the body member 19.

On the upper surface of the seal support 34, there is provided an integrally formed arc-shaped projection 48 which serves as a stop to locate and limit the rotation of the control knob 26. The lower face of the control knob 36 is formed with a circular recess 49 which lies immediately inside of the portion of the control knob flange 37 which rides on the seal support 34. The arc-shaped projection 48 on the seal support extends upwardly into the recess 49. Also received in the recess 49 is a radial projection 50 extending inwardly from the control knob flange 37, as is best shown in FIG. 5. The arc-shaped projection 48 on the seal support 34 and the radial projection 50 on the control knob are located the same radial distance from the axis of rotation of the control knob 26 so that rotation of the control knob causes these projections 48 and 50 to engage and to limit further rotation of the control knob. This interengagement of the projections 48 and 50 serves as a twofold purpose. First, it defines the limits of rotation of the control knob 26, and second, it provides means for orienting the control knob with respect to the seal support and the body 19 during assembly of the sprinkler.

To assemble the various parts of the sprinkler head, it is necessary only to locate the spray tubes 21 in a preselected position and then align the locating means on the head 19, the seal support 34 and the control knob 26. The spray tubes 21 are positioned as shown in FIG. 2 with the spray orifices 23 directed horizontally. The control knob 26 and seal support 34 are assembled as shown in FIG. 4 with the control knob rotated clockwise until projection 50 engages projection 48 at which time the arrow 42 on the control knob is directed toward the slot 46. With the support 34 and the control knob in this relative position, the gasket 35, the support 34 and the control knob 26 are assembled to the head 19 with the body projection 45 entering the slot 46. At this time the assembly ring 30 is threaded onto the body member 19 and tightened down firmly. The threads have been molded on the body 19 and the assembly ring 30 in such an orientation that the numerals 43 on the ring 30 will automatically be positioned properly with respect to the arrow 42 on the control knob 26. The positioning of the threads on the body 19 and assembly ring 30 determine the relative rotary positions of these parts in their assembled position, and therefore, the proper orientation of the indicia carried by ring 30 with respect to body 19 and the arrow 42 is obtained. In the instant case, the small diameter pattern setting, i.e., five feet, will be positioned opposite the arrow 42 when the spray tubes are in the position shown in FIG. 2.

Thus, by properly orienting the stops 48 and 50 and engaging the projection 45 in the slot 46, the parts are all properly oriented with respect to the body member 19. The parts are simply fitted together with the assembly ring 30 being threaded by hand onto the body 19 to complete assembly of the sprinkler. The one-piece gasket 35 provides a very inexpensive and satisfactory means for sealing the chamber 41 formed by the body member 19 and the seal support 34. The entire sprinkler head is made of inexpensive molded plastic parts and requires no screws, bolts or other separate assembly means. The assembly ring 30 serves to retain the parts in good sealed relationship while still permitting the control knob 26 to be rotated freely to adjust the position of the spray tubes 21.

While there has been shown and described a particular embodiment of the present invention, it will be obvious to those skilled in the art that changes and modifications may be made without departing from the invention, and that it is intended in the appended claims to cover all such changes and modifications as fall within the true spirit and scope of the invention.

What is claimed as new and desired to be secured by Letters Patent of the United States is:

1. A lawn sprinkler head comprising a head member, bearing means for supporting said head member for rotation, said head member having an upwardly facing recess, a cap threadedly received on said head member to form a water chamber in said recess, a support member received between said cap and said head member, a spray tube control knob retained between said support member and said cap, said control knob being supported for rotation and having a portion extending within said chamber into engagement with an adjustably mounted spray tube.

2. A lawn sprinkler comprising a head member supported for rotation about a vertical axis, said head member having an upwardly facing recess, a spray member adjustably mounted on said head to vary the water distribution pattern, a seal support extending across the opening to said recess, a control knob supported for rotation on said seal support and having a shaft extending through said seal support into said recess for engagement with said spray member, a retaining ring threadedly received on said head member and having a stepped flange for clamping said seal support to said head member and to rotatably retain said control knob thereon.

3. A lawn sprinkler comprising a head member supported for rotation on a base, said head member being hollow and having a pair of elongated spray tubes extending through the walls of said head member, an upwardly facing access opening being provided in said head member, means mounting each of said spray tubes for adjustable positioning about its lengthwise extending axis, gear sectors formed on the inner ends of said tubes within said head member, a control knob having a shaft with a gear formed at the lower end for simultaneous engagement with said gear sectors, an indicia bearing ring carried by said head and positioned to retain said knob for rotary movement on said head, a seal support mounted on said head member below said knob with said shaft extending through said seal support, and a flat one-piece gasket member coextensive with the bottom of said seal support, said ring clamping said seal support and said gasket around the periphery of said access opening to form a water sealed chamber within said head member, said gasket engaging said shaft to prevent leakage along said shaft.

4. The lawn sprinkler of claim 3 wherein said seal support and said head member are provided with interengaging keying portions to locate said seal support with respect to said head member, interengaging stop means on said control knob and said seal support to limit the range of rotary movement of said knob with respect to said head member, and assembly means locating said ring and the indicia thereon in a predetermined position with respect to said head member.

5. A lawn sprinkler comprising a head rotatably mounted on a base, said head including a body having two outwardly extending adjustably mounted spray tubes, said body being hollow and having an upwardly facing access opening, an assembly ring threadedly received on the portion of said body defining said opening, an inwardly directed stepped flange provided on said ring, a gasket, a gasket support coextensive with said gasket clamped with said gasket against said body by said flange to close said opening, a control knob having a peripheral flange positioned between said stepped flange and said seal support to mount said control knob for rotation with respect to said head, and a shaft extending downwardly through said seal support and gasket into said hollow body for adjustment of said spray tubes.

6. The lawn sprinkler of claim 5 wherein said seal support and said control knob are provided with inter-engaging means to limit the range of movement of said control knob with respect to said head.

7. The lawn sprinkler of claim 6 wherein said seal support and said assembly ring are provided with portions which engage cooperating portions of said body to locate in predetermined relative rotary positions said ring and said range of control knob movement with respect to said body, and indicia means on said control knob and said ring to indicate the position of the spray tubes.

References Cited by the Examiner

UNITED STATES PATENTS

| 2,080,656 | 5/1937 | De Vries | 16—121 |
| 2,407,322 | 9/1946 | Morrison | 74—471 |
| 2,591,073 | 4/1952 | Jepson | 239—262 |
| 3,023,602 | 3/1962 | Foote et al. | 70—332 |

EVERETT W. KIRBY, *Primary Examiner.*